US008843492B2

(12) United States Patent
Cao et al.

(10) Patent No.: US 8,843,492 B2
(45) Date of Patent: Sep. 23, 2014

(54) RECORD LINKAGE BASED ON A TRAINED BLOCKING SCHEME

(75) Inventors: Yunbo Cao, Beijing (CN); Chin-Yew Lin, Beijing (CN); Pei Yue, Redmond, WA (US); Zhiyuan Chen, Fuzhou (CN)

(73) Assignee: Microsoft Corporation, Redmond, WA (US)

( * ) Notice: Subject to any disclaimer, the term of this patent is extended or adjusted under 35 U.S.C. 154(b) by 80 days.

(21) Appl. No.: 13/372,360

(22) Filed: Feb. 13, 2012

(65) Prior Publication Data

US 2013/0212103 A1      Aug. 15, 2013

(51) Int. Cl.
*G06F 17/30* (2006.01)

(52) U.S. Cl.
USPC .......................................... 707/737

(58) Field of Classification Search
None
See application file for complete search history.

(56) References Cited

U.S. PATENT DOCUMENTS

| | | | |
|---|---|---|---|
| 7,152,060 B2 * | 12/2006 | Borthwick et al. | 707/770 |
| 7,672,915 B2 | 3/2010 | Dara et al. | |
| 7,702,631 B1 * | 4/2010 | Basu et al. | 707/999.006 |
| 7,899,796 B1 | 3/2011 | Borthwick et al. | |
| 7,912,842 B1 | 3/2011 | Bayliss | |
| 2007/0174277 A1 * | 7/2007 | Giang et al. | 707/7 |
| 2008/0215563 A1 * | 9/2008 | Shi et al. | 707/5 |
| 2009/0228410 A1 | 9/2009 | Veeramachaneni | |
| 2011/0145178 A1 | 6/2011 | Schmidtler et al. | |
| 2011/0191353 A1 | 8/2011 | L'Heureux et al. | |
| 2012/0278263 A1 * | 11/2012 | Borthwick et al. | 706/12 |

OTHER PUBLICATIONS

Cao, et al., "Leveraging Unlabeled Data to Scale Blocking for Record Linkage", Proceedings of the Twenty-Second International Joint Conference on Artificial Intelligence, vol. 3, Jul. 2011, pp. 2211-2217.*
Bilenko, et al., "Adaptive Blocking: Learning to Scale up Record Linkage", retrieved on Sep. 20, 2011 at >>http:// citeseerx.ist.psu. edu/viewdoc/download?doi=10.1.1.85.949&rep=rep1 &type=pdf>>, Proceedings of the Sixth IEEE International Conference on Data Mining, Dec. 18-22, 2006, pp. 87-96.
Jin, et al., "Efficient Record Linkage in Large Data Sets", retrieved on Sep. 20, 2011 at <<http://flamingo.ics.uci.edu/pub/dasfaa03.pdf>>, Proceedings of the Eighth International Conference on Database Systems for Advanced Applications, Mar. 2003, 25 pages.
Michelson, et al., "Learning Blocking Schemes for Record Linkage", retrieved on Sep. 20, 2011 at <<http://citeseerx.ist.psu.edu/viewdoc/ download?doi=10.1.1.73.1134&rep=rep1&type=pdf>>, Proceedings of the 21st National Conference on Artificial Intelligence, vol. 1, Jul. 2006, pp. 440-445.
Winkler, William E., "Methods for Record Linkage and Bayesian Networks", retrieved on Sep. 20, 2011 at <<http://www.amstat.org/ sections/srms/Proceedings/y2002/files/JSM2002-000648.pdf>>, Technical Report Statistical Research Report Series, US Bureau of the Census, 2002, 27 pages.

* cited by examiner

*Primary Examiner* — Bai D. Vu
(74) *Attorney, Agent, or Firm* — Dan Choi; Judy Yee; Micky Minhas

(57) ABSTRACT

Some implementations disclosed herein provide techniques and arrangements to train a blocking scheme using both labeled data and unlabeled data. For example, training the blocking scheme may include iteratively: learning a conjunction, identifying first matches in the labeled data and the unlabeled data that are uncovered by the conjunction, and identifying second matches in the labeled data and the unlabeled data that are covered by the conjunction. The conjunction learned in each iteration may be combined using a disjunction. A search engine may use the search engine when searching for records that match an entity.

20 Claims, 9 Drawing Sheets

500 ⟶

1: Input: Training set $D'$,
      Set of blocking predicates $\{p_i\}$
      A coverage threshold parameter $\sigma$
      A precision threshold parameter $\tau$
      A parameter for beam search $k$
2: $c^* \leftarrow$ null; $C \leftarrow \{p_i\}$;
3: repeat
4:   $C' = \emptyset$;
5:   for all $c \in C$ do
6:     for all $p \in \{p_i\}$ do
7:       if $\text{cov}(D', c \wedge p) < \sigma$ then
8:         continue;
9:       end if
10:      $c' \leftarrow c \wedge p$;
11:      $C' = C' \cup \{c'\}$;
12:      Remove any $c'$ that are duplicates from $C'$;
13:      if $\text{cost}(D'_L, c') + \alpha \cdot \text{cost}(D'_U, c') < \text{cost}(D'_L, c^*) +$
          $\alpha \cdot \text{cost}(D'_U, c^*)$ and $precision(c') > \tau$ then
14:        $c^* \leftarrow c'$;
15:      end if
16:    end for
17:  end for
18:  $C \leftarrow$ best $k$ members of $C'$;
19: until $C$ is empty
20: return $c^*$

FIG. 5

RECORD LINKAGE BASED ON A TRAINED BLOCKING SCHEME

BACKGROUND

Record linkage is the process of identifying records between two or more data sets that represent the same entity. A record linkage process that computes the similarities between all pairs of records can be computationally prohibitive for large data sets. A blocking scheme may be used to reduce the number of computations to be performed by dividing the records into blocks and only comparing records within the same block.

Some blocking schemes may be created using machine learning, in which an algorithm is trained using a set of labeled data. The set of labeled data is a data sample that has been manually labeled (e.g., tagged) by humans to assist in the machine learning. However, the set of labeled data used for training is usually not large enough to characterize unlabeled data. As a result, the blocking scheme may perform poorly when processing the unlabeled data by generating too many candidate matches.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques and arrangements to train a blocking scheme using both labeled data and unlabeled data. For example, training the blocking scheme may include iteratively: learning a conjunction, identifying first matches in the labeled data and the unlabeled data that are uncovered by the conjunction, and identifying second matches in the labeled data and the unlabeled data that are covered by the conjunction. The conjunction learned in each iteration may be combined using a disjunction. A search engine may use the search engine when searching for records that match an entity.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 5 illustrates an example of a learn-one-conjunction algorithm according to some implementations.

DETAILED DESCRIPTION

Record Linkage and Blocking Schemes

Figure 1:
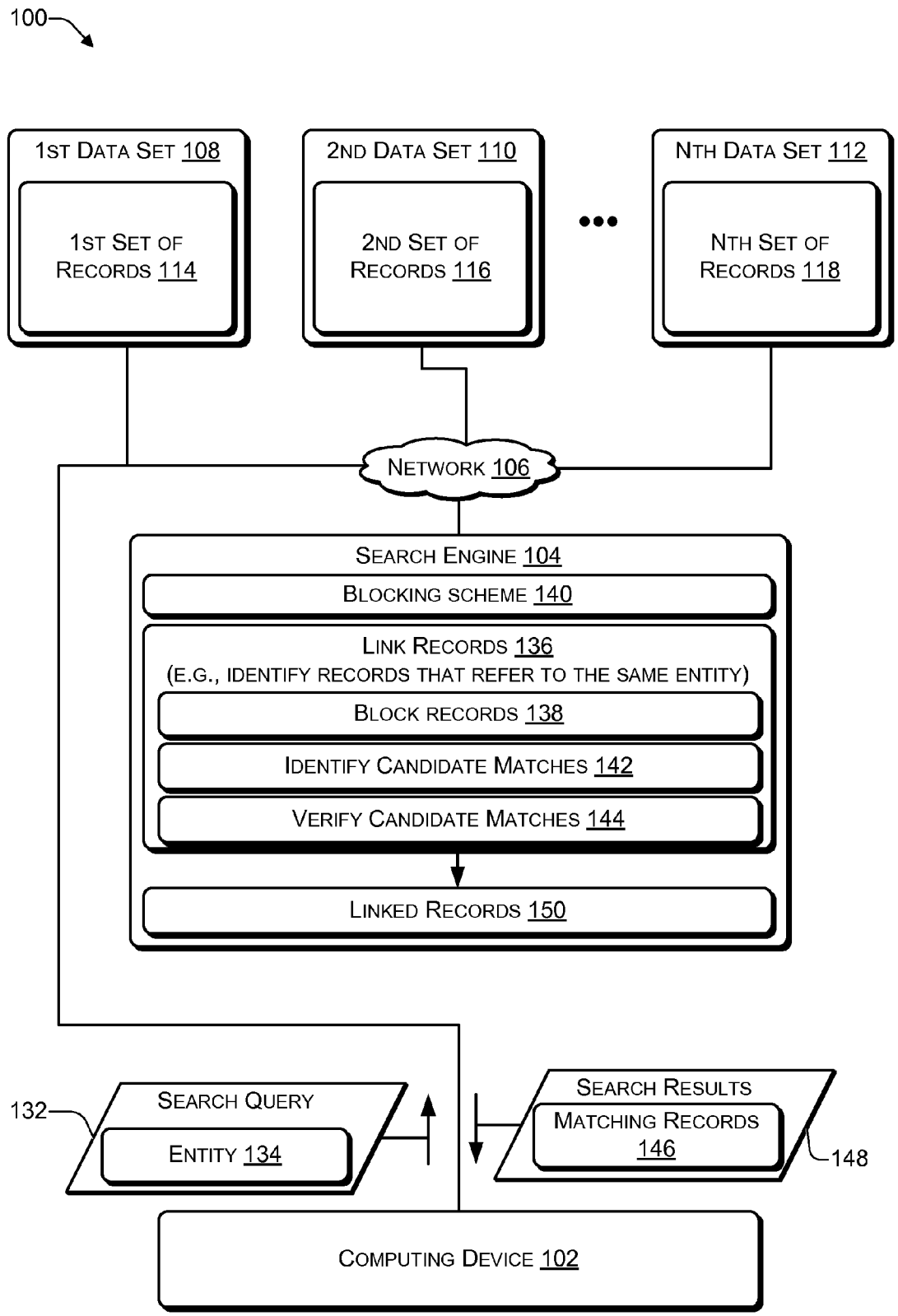
FIG. 1 illustrates an example framework including a search engine that links records using a blocking scheme according to some implementations.

The technologies described herein generally relate to record linkage. Record linkage is the process of identifying matching records between multiple data sets that represent the same entity. For example, a search engine may enable a user to perform a price comparison for a particular item (e.g., a tangible/physical item, a downloadable item, a service, and the like) that are available for acquisition (e.g., for purchase, rental, one time use, and the like). The search engine may identify records from different online merchant sites that refer to the same particular entity. As another example, a user may desire to view information about an entity such as a particular individual and send a query to a search engine with the name of the particular individual. The search engine may identify records from multiple websites, including multiple social networking websites, a workplace website associated with the particular individual, and other websites that include information associated with the particular individual. Thus, the search engine may create a composite profile for the particular individual based on data retrieved from multiple records hosted by multiple websites.

Record linkage may become computationally challenging when scaled to large data sets because of the number of comparisons that are to be performed. To reduce the number amount of record pair comparisons to be performed, a technique called blocking may be used before the record linkage. In blocking, one or more attributes may be used to partition (e.g., group) records into blocks, such that records with the same blocking attribute are grouped into the same block. Record linkage is then performed by comparing records within the same block, with the assumption that records in different blocks are unlikely to match.

A blocking technique that uses labeled data may include sampling a portion of data, having humans manually label the data to create labeled data, and then creating the blocking scheme by machine learning using the labeled data. However, using only labeled data for training a blocking scheme has several limitations. For example, labeled data may be expensive to obtain in terms of the human effort and/or time involved in labeling a data sample. In addition, the size of the labeled data may not be large enough to properly characterize the unlabeled (e.g., unseen) data, resulting in a blocking scheme that performs poorly on the unseen data by generating too many candidate matches. Moreover, a blocking scheme trained using labeled data may tend to accommodate the labeled data and may not work well for the unlabeled data. For example, in a shopping comparison search engine, blocking an item by brand (e.g., manufacturer) may work well for labeled data if each brand has one product but may not work well for the unlabeled (e.g., unseen) data because a particular brand may have hundreds (or even thousands) of associated models. For example, a camera manufacturer, brand XYZ, may have numerous models associated with the XYZ brand.

To rectify the shortcoming of using only labeled data for training the blocking scheme, a blocking scheme that is trained using both labeled data and unlabeled data may be used. For example, given a set of labeled data and unlabeled data, learning techniques may be used to identify blocking attributes and comparison methods for the blocking attributes by training the blocking scheme to maximize the number of matching record pairs that are identified and to minimize the number of non-matching record pairs in a particular block.

In addition, the blocking scheme may be trained to minimize the number of candidate matches (of records) identified in the unlabeled data. The unlabeled data that is used to training the blocking scheme may be a combination of multiple samples (e.g., subsets) of sets of unlabeled data. Each sample of unlabeled data may include a random sampling of a set of unlabeled data that is smaller in size than the set of unlabeled data.

Search Engine Framework

FIG. 1 illustrates an example framework 100 including a search engine that links records using a blocking scheme according to some implementations. The framework 100 may be executed by a computing device or other particular machine specifically configured with processor-executable instructions, as discussed additionally below. The framework 100 may include a computing device 102 coupled to a search engine 104 via a network 106. The network 106 may include multiple networks employing a variety of technologies, such as wired technologies (e.g., public switched telephone network (PSTN), Ethernet, digital subscriber line (DSL), data over cable service interface specification (DOCSIS), fiber optic cable, synchronous optical network (SONET), asynchronous transfer mode (ATM), Internet Protocol (IP), and the like) and wireless technologies (e.g., code division multiple access (CDMA), global system for mobile (GSM), Universal Mobile Telephone Service (UMTS), Worldwide Interoperability for Microwave Access (WiMax), WiFi, and the like).

The search engine 104 may be capable of searching multiple data sets, such as a first data set 108, a second data set 110, and an Nth data set 112, where N is greater than two. For example, a first website (e.g., associated with a first merchant) may include the first data set 108, a second website (e.g., associated with a second merchant) may include the second data set 110, and a third website (e.g., associated with a third merchant) may include the third data set 112. The first data set 108 may include a first set of records 114, the second data set 110 may include a second set of records 116, and the Nth set of records 116 may include an Nth set of records 118.

In operation, the search engine 104 may train a blocking scheme 140 using a set of labeled data and a set of unlabeled data. The search engine 104 may crawl multiple sets of records, such as one or more of the set of records 114, 116, or 118. The search engine 104 may use the trained blocking scheme 140 to link records 136 from one or more of the sets of records 114, 116, or 118. For example, the blocking scheme 140 may block (e.g., group) records 138 from one or more of the sets of records 114, 116, or 118.

After the block records 138 operation, the blocking scheme 140 may identify candidate (e.g., potential) matches 142 in the blocked (e.g., grouped) records. The blocking scheme 140 may perform a verify candidate matches 144 operation on the identified candidate records. In this way, the blocking scheme 140 may create a set of linked records 150 in which records from different sets of records (e.g., the sets of records 114, 116, or 118) that refer to the same entity are linked. For example, the linked records 150 may link a record from the first set of records 114 (e.g., of a first merchant site), a record from the second set of records 114 (e.g., of a second merchant site), and a record from the third set of records 118 (e.g., of the third merchant site) because all three records refer to the same entity (e.g., an item offered for purchase by each of the merchant sites. To illustrate, the three records may each refer to a model XYZ camera that is offered for purchase by each of the merchant sites. The computing device 102 may send a search query 132, including an entity 134, to the search engine 104. The search query 132 may instruct the search engine 104 to search for records that include matches to the entity 134 (e.g., records in which at least a portion of each of the records matches the entity 134). For example, the search query 132 may be sent by a user who is looking for a price comparison for a particular product (e.g., the entity 134) from multiple merchant websites.

In response to receiving the search query 132, the search engine 104 may perform a search that includes searching the linked records 150 for records that include and/or reference the entity 134. Based on the search, the search engine 104 may provide matching records 146. The matching records 146 may be included in search results 148 that are sent to the computing device 102 (e.g., an originator of the search query 132). For example, the matching records 146 may include records from one or more of the data sets 108, 110, or 112 in which at least a portion of the matching records 146 matches the entity 134. To illustrate, when the entity 134 is a particular product name or model, the matching records 146 may include the particular product name or model and associated prices from multiple merchants. As another illustration, when the entity 134 is a name of a person, the matching records 146 may include the name of the person and information associated with the person. The information associated with the person may be selected from records at multiple websites, such as social network websites, work-related websites, news-related websites, other types of websites, or any combination thereof.

Thus, the search engine 104 may receive a search query 132 for an entity 134 and perform a search that includes searching the linked records 150. The linked records 150 may be created by using the blocking scheme 140 to link records from multiple data sets (e.g., one or more of the data sets 108, 110, or 112). In response to the search query 132, the search engine may provide the matching records 146 in the search results 148.

As compared to using conventional blocking schemes, using the blocking scheme 140 that is trained using both labeled data and unlabeled data, the number of matching record pairs that are identified may be increased and the number of non-matching record pairs in a particular block may be reduced, increasing the accuracy and efficiency of the search engine 104.

Training Using Labeled and Unlabeled Data

Figure 2:
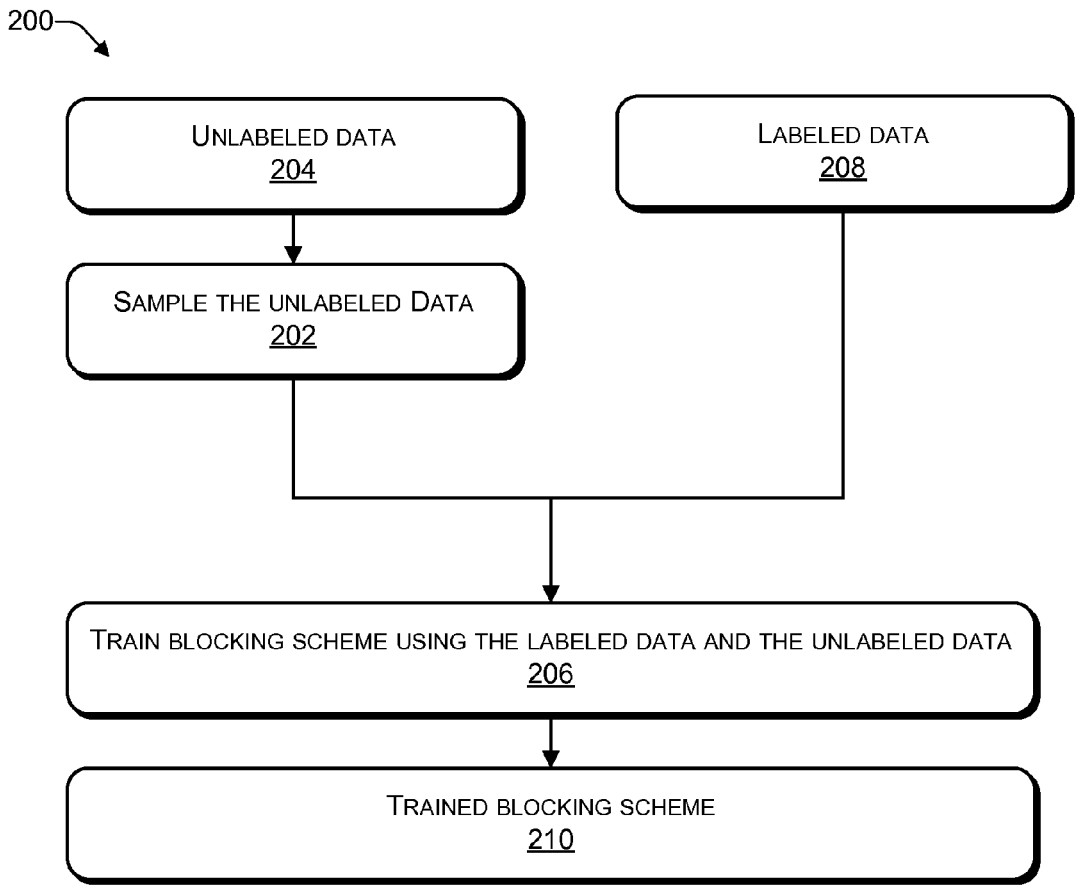
FIG. 2 is a flow diagram of training a blocking scheme using labeled data and unlabeled data according to some implementations.

FIG. 2 is a flow diagram 200 of training a blocking scheme using labeled data and unlabeled data according to some implementations. For example, the flow diagram 200 may be used to train a blocking scheme off-line before the blocking scheme is used online.

At At 202, unlabeled data 204 may be sampled to create a sample of the unlabeled data. The unlabeled data 204 may include unlabeled data selected from one or more data sets (e.g., the data sets 108, 110, or 112). At 206, a blocking scheme (e.g., the blocking scheme 140) may be trained using both the sample of the unlabeled data 204 and labeled data 208. The labeled data 208 may include labeled data selected from one or more data sets (e.g., the data sets 108, 110, or 112). At 210, the trained blocking scheme may be provided for use, such as for use with a search engine.

Thus, a blocking scheme may be trained using both labeled data and unlabeled data. The blocking scheme may be trained to maximize the number of true matches while minimizing the number of false matches.

Blocking Records

Figure 3:
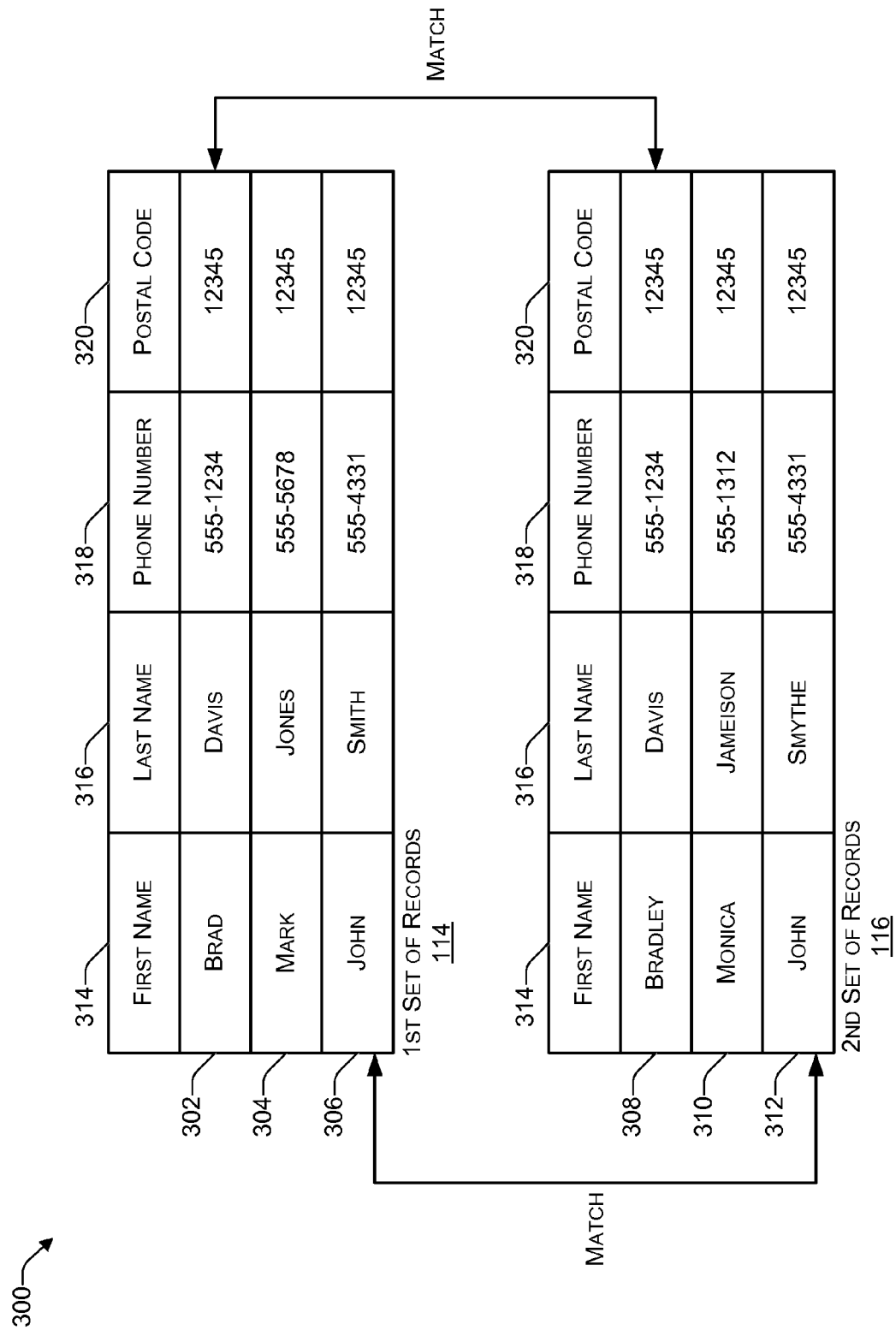
FIG. 3 illustrates an example framework including blocking records according to some implementations.

FIG. 3 illustrates an example framework 300 including blocking records according to some implementations. The first set of records 114 may include records 302, 304, and 306. The second set of records 116 may include records 308, 310, and 312. The sets of records 114 and 116 may include multiple fields, such as a first name 314, a last name 316, a phone number 318, and a postal code 320.

Different blocking schemes may yield different results. For example, if the blocking scheme 140 blocks records using the postal code 320, the records 302, 304, 306, 308, 310, and 312 will be grouped into a particular block. As another example, the blocking scheme 140 may block records using the first letter of the first name 316 and the first letter of the last name 316. In this example, two true matches may be identified (e.g., record 302 and record 308 refer to the same entity and records 306 and 312 refer to the same entity) and one false match may be identified (e.g., records 304 and 310 both are records associated with individuals having the initials "MJ" but do not refer to the same entity). As yet another example, the blocking scheme 140 may block records using the first two letters of the first name 316 and the first two letters of the last name 316. In this example, two true matches may be identified (e.g., record 302 and record 308 refer to the same entity and records 306 and 312 refer to the same entity) without any false matches.

Thus, different blocking schemes may yield different results. The blocking scheme 140 may be trained to maximize the number of true matches that are identified and to minimize the number of false matches that are identified. One technique to achieve this result may be to train the blocking scheme using multiple passes, with each pass using particular blocking criteria and then combining the blocking criteria from each pass.

Blocking Scheme

A blocking scheme may be created using a set of blocking predicates. A blocking predicate may be defined as a pair comprising <blocking attribute, comparison method>. Thus, if there are t blocking attributes and d comparison methods, there may be t×d possible blocking predicates. For example, when an entity is a product available for acquisition, attributes of the entity may include a brand name, a model number, a type of product, and the like. Examples of a comparison method may include exact match, match first three alphanumeric characters, etc. Thus, a blocking predicate <model number, exact match> may block (e.g., group) particular records together in the same block if the particular records share the same model number.

A blocking scheme may be defined as a disjunction of conjunctions of blocking predicates. For example, a blocking scheme with two conjunctions may be expressed as (<product name, same first three alphanumeric characters> <brand name, exatc match>) <model number, exact match>.

Expressed as machine learning, the input space may denoted by X and the output space may be denoted by Y, and the task may be expressed as learning a hypothesis function h: X→Y to predict y when given x, where x represents a record consisting of m attributes and y represents the entity identifier for x, and where h is determined by a blocking scheme P (a disjunction of conjunctions), denoted as $h_p$. Thus, given two records $x_1$ and $x_2$, $h_p(x_1)=h_p(x_2)$ if and only if $x_1$ and $x_2$ are grouped into the same block (e.g., they are linked to the same entity).

As previously discussed, the training set may include labeled data and unlabeled data. Mathematically, the training set D may include two subsets, e.g., $D = D_L \cup D_U$, where $D_L = \{x_i, y_i\}_{i=1}^{l}$ and $D_U = \{x_j\}_{j=l+1}^{l+u}$. Note that u may be greater than l and $\{x_i\}_{i=1}^{l}$ may be denoted by $D_L^x$.

The goal for training the blocking scheme 140 may be expressed as identifying the best hypothesis function $h_p$ that minimizes the number of candidate matches in the labeled data $D_L$, minimizes the number of candidate matches in the unlabeled data $D_U$, and maximizes the number of true matches in the candidate set generated from $D_L$. Mathematically, the goal may be expressed mathematically as the following function:

$$\underset{h_P}{\arg\min}\, cost(D_L^x, P) + \alpha \cdot cost(D_U, P) \tag{1a}$$

$$\text{subject to } cov(D_L, P) > 1 - \epsilon \tag{1b}$$

where cost(*,*) and cov(*,*) are two functions defined as follows:

$$cost(A, p) = \sum_{x \in A, x' \in A, x \neq x'} \frac{I[h_p(x) = h_p(x')]}{|A|(|A|-1)} \tag{2}$$

$$cov(Z, p) = \sum_{\substack{(x,y) \in Z, (x',y') \in Z \\ x \neq x'}} \frac{I[h_p(x) = h_p(x'), y = y']}{2M(Z)} \tag{3}$$

where A is a set of records without labels, Z is a set of records with labels, and p is a blocking scheme. M(z) is the number of true matches in Z, and I[.] is an indicator function that equals one if the condition holds and zero otherwise. The first term in equation (1a) minimizes the number of candidate matches in the labeled data $D_L$, the second term in equation (1a) minimizes the number of candidate matches in the unlabeled data $D_U$, and equation (2) corresponds to the constraint to maximize the number of true matches in the candidate set generated from $D_L$. The parameter indicates that up to true matches may remain uncovered, e.g., identifying noise and/or particularly difficult true matches. The parameter α may be used to control the effect of the unlabeled data $D_U$. If α=0.0, then only labeled data may be used in the process of learning the blocking scheme P. If α=1.0, then labeled data and unlabeled are given equal importance when learning the blocking scheme.

The size of $D_U$ may be fairly large in real applications. For example, for a price comparison search engine, $D_U$ may include thirty million or more product offerings. This large amount of data illustrates the advantages of using unlabeled data during learning because a small amount of labeled data may not accurately characterize such a large amount of data. As will be discussed below, the process of learning the blocking scheme may involve multiple passes through the data. Given the amount of unlabeled data, including all unlabeled data in the learning process may be impractical. Instead, a portion of the unlabeled data may be sampled. For example, samples may be taken from multiple websites, creating s subsets $\{D_U^i\}_{i=1}^{s}$ from randomly sampling records from $D_U$. The sampling rate may be chosen such that $|D_U^i|=|D_U|$ (1≤i≤s). When using sampling, the second term of equation (1a) may be expressed as follows:

$$\alpha \cdot f(\{cost_i\}_{i=1}^{s}) \tag{4}$$

where f(·) is an aggregation function that returns a single value from a collection of input values. In equation (4), $cost_i$ may be calculated as follows:

$$cost_i (= cost(D_U^i, P)) \quad (5)$$

The aggregation function may be average and/or mα. and expressed as:

$$f_{avg}(\{cost_i\}_{i=1}^s) = \frac{1}{s} \cdot \sum_{i=1}^{s} cost_i \quad (6)$$

$$f_{max}(\{cost_i\}_{i=1}^s) = \max_{i=1}^{s} cost_i \quad (7)$$

The average aggregation function may examine each sample subset and treat each sample subset equally. In contrast, the mα. aggregation function may examine the worst case, in which the subset generates the most candidate matches.

Sequential Covering Algorithm

Figure 4:
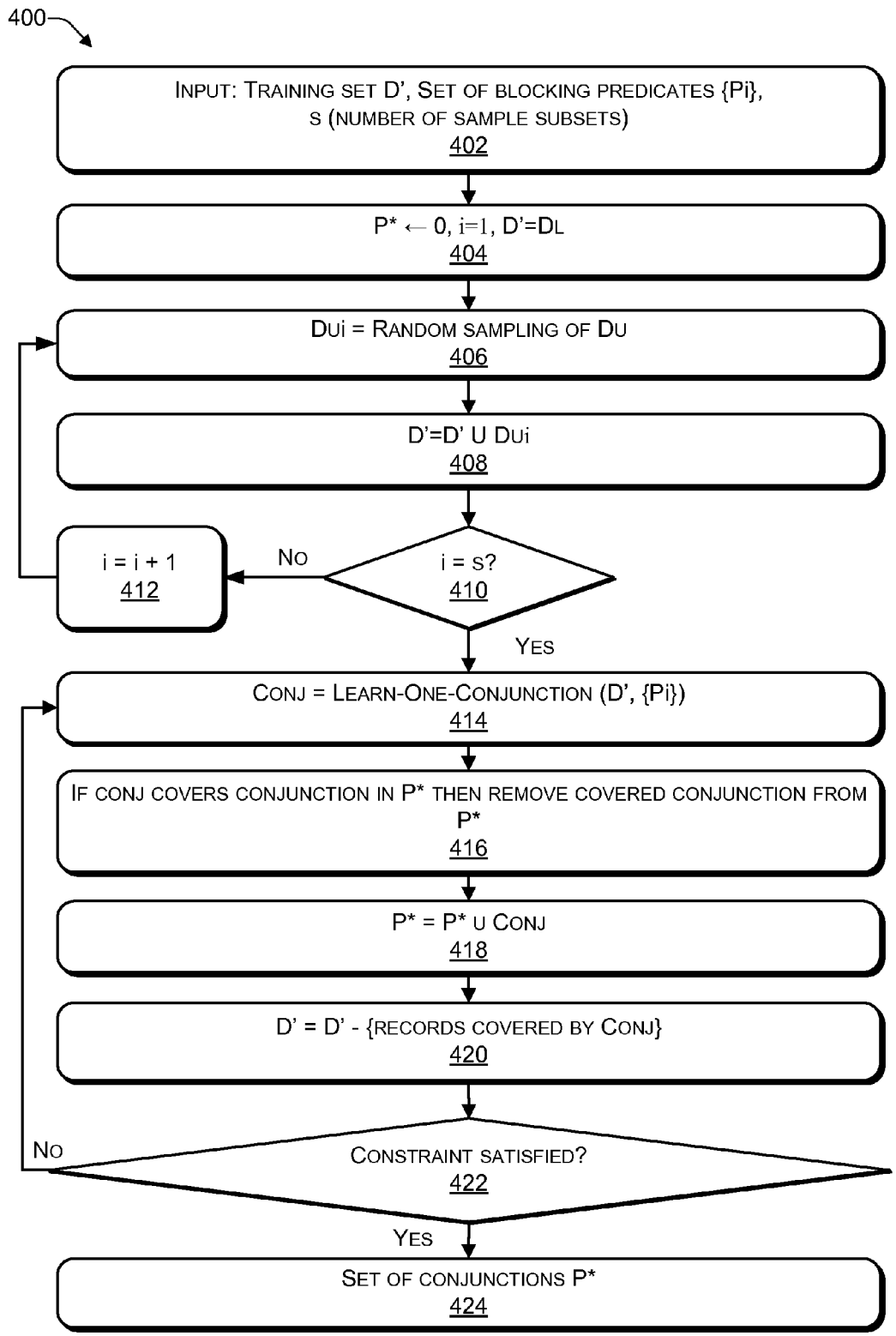
FIG. 4 is a flow diagram of an example process for a sequential covering algorithm according to some implementations.

FIG. 4 is a flow diagram of an example process 400 for a sequential covering algorithm according to some implementations. Though the process 400 is illustrated using an itervative algorithm, the process 400 may be implemented using a non-iterative or using other types of algorithms.

Applying a particular conjunction of blocking predicates to the data $D_L^x$ may create a block which includes all the matches that satisfy the conjunction. The constraint provided by equation (2) may be expressed as: given multiple subsets of $D_L^x$ (with each being determined by one conjunction in the blocking scheme) as inputs, select a number of these subsets so that the selected sets contain almost all the elements of a set formed by all the matches in $D_L$. The process of selecting subsets may be used to minimize equations (1a) and (1b).

At block 402, the input to the algorithm may include a training set D', a set of blocking predicates $\{p_i\}$, and a number of sample subsets s.

At block 404, the set of blocking predicates is initially the null set, e.g., $P^* \leftarrow \emptyset$, i is set to one, e.g., i=1, and the training data is initially the labeled data, e.g., $D'=D_L$.

At blocks 406 through 412, the training data D' is expanded to include a sample i of the unlabeled data $D_U$. For example, at block 406, an $i^{th}$ random sample of the unlabeled data is obtained. At 408, the training data D' is assigned the union of the previous set of training data D' with the $i^{th}$ random sample of unlabeled data obtained at block 406. At block 410, a determination is made whether i equals the number of subsets of unlabeled data that were received as input in block 402. If the answer at block 410 is no (e.g., s number of samples have not yet been obtained) then the process proceeds to block 412 where i is incremented and the another sample of the unlabeled data is obtained at step 406. If the answer at block 410 is yes (e.g., s number of samples have been obtained) then the process proceeds to block 414.

At block 414, the learn-one-conjunction algorithm, described in more detail in FIG. 5, is performed using the training data and the blocking predicates $\{p_i\}$ as input to learn the conjunction conj.

At block 416, if conj covers one or more conjunctions in the of blocking predicates P*, then the covered conjunctions are removed from the set of blocking predicates P*.

At block 418, the newly learned conjunction is included in the set of blocking predicates, e.g., $P^*=P^* \cup conj$.

At block 420, records that are covered by the newly learned cojunction conj are removed from the training set, e.g., $D' \leftarrow D'$ {examples covered by conj}.

At block 422, a determination is made whether the constraint expressed by equation (2) has been satisfied. If a determination is made at block 422 that the constraint is not satisfied, then the process proceeds to block 414, where another conjunction is learned. If a determination is made at block 422 that the constraint is satisified, then the process proceeds to block 424, where the set of conjunctions P* is used for the blocking scheme.

Thus, at blocks 414 through 422, a disjunction is created by repeatedly learning a conjunction (e.g., conj) of blocking predicates using the learn-one-conjunction algorithm (described in detail in FIG. 5). In each iteration, after a conjunction (e.g., conj) is learned, the records covered by the conjunction are removed from the training data D'. The loop created by blocks 414 through 422 is exited when the constraint expressed as equation (2) is satisfied, e.g., when noise and particularly difficult true matches are minimized. At block 414, each conjunction is learned independently of other conjunctions because learn-one-conjunction does not take into consideration any previously learned conjunctions. Therefore, there is the possibility that a first set of records covered by a first conjunction is a subset of a second set of records covered by a second case. If this situation occurs, the first set of records are removed from the training set at block 420.

Learn-One-Conjunction Algorithm

FIG. 5 illustrates an example of a learn-one-conjunction algorithm 500 according to some implementations. The algorithm 500, or variations of the algorithm, may be used to learn a conjunction given a set of training data (e.g., D') and a set of blocking predicates. During the learning process, the algorithm 500 may minimize equation (1a). During the learning process, the conjnuctions may become more restrictive by including more blocking predicates.

The algorithm 500 may use a general-to-specific beam (or similar) search in which each conjunction is as restrictive as possible because at each iteration a new blocking predicate p may be added to the previous conjunction c*. Any particular conjunction learned by the general-to-specific beam search may have a minimum coverage σ. The final disjunction P* may combine one or more of the conjunctions to increase coverage.

The coverage threshold, σ, may be used to control how aggressive the algorithm claims uncovered labeled data. When σ is small (e.g., 0.2), minimizing the objective (1a) may have a higher probability of returning a highly inaccurate blocking predicate. To address this, the precision threshold parameter c* may be determined on the basis of a development set. By varying the precision threshold parameter τ, a balance between precision and recall of the resultant blocking scheme may be created. For example, a larger τ may cause every conjunction to be highly accurate, making the final blocking scheme very precise, but may lower recall as it restricts the space of candidate conjunctions.

At line 1, input may be received. The input may include a set of blocking predicates $\{p_i\}$, a coverage threshold parameter σ, a precision threshold parameter τ, a parameter for beam search k.

At line 2, a conjunction c* may be initially set to null and C may be initially assigned the set of blocking predicates $\{p_i\}$ In lines 3-19, each outer loop may increase the candidate conjunctions by including one additional predicate. This may be achieved by looping through all the members of the current candidate set c ∈ C in line 5 and looping through all the members of the set of blocking predicates $\{p_i\}$ in line 6.

The algorithm 500 may be used to learn a predicate that covers a sufficient number of true matches (e.g., lines 7-9) and is sufficiently restrictive to satisfy lines 13-14 (e.g., minimize the equation (1a)).

At lines 10-11, the candidate conjunctions may become more restrictive in each loop by including (e.g., adding) at least one predicate.

At line 12, duplicate conjunctions may be removed. For example, two conjunctions, a b and a c, may be selected in a previous loop. In a current loop, each conjunction may be grown by adding another predicate. For example, a b may be grown to a b c by adding c and a c may be grown to a b c by adding b. Because there are now (e.g., in the current loop) two identical conjunctions, the duplicate conjunction may be removed at line 12.

At lines 13-14, a determination is made whether the equation 1(a) has been minimized, e.g., determine whether the learned predicate is sufficiently restrictive to satisfy lines 13-14.

As previously mentioned, algorithm 500 may use a beam search. In each loop, as the conjunctions are grown to include more predicates, the best k predicates may be retained in the set of candidate predicates while discarding the remaining predicates. To illustrate, predicate $p_1$ may be worse that predicate $p_2$ in terms of minimizing equation 1(a). However, if an additional predicate was added, $p_1$ a may be better than $p_2$ b in terms of minimizing equation 1(a). Thus, the beam may be used to keep the promising candidates.

Thus, the algorithm 500 may learn a conjunction that minimizes the objective expressed by equation (1a) such that when the conjunction is disjoined with other conjunctions, the conjunction may contribute as few false-positive candidate matches to the final candidate set as possible. Because the training set includes labeled and unlabeled data, the number of candidate matches for $D'_L$ and that for $D'_U$ may be reduced (e.g., minimized).

Example Processes

Figure 6:
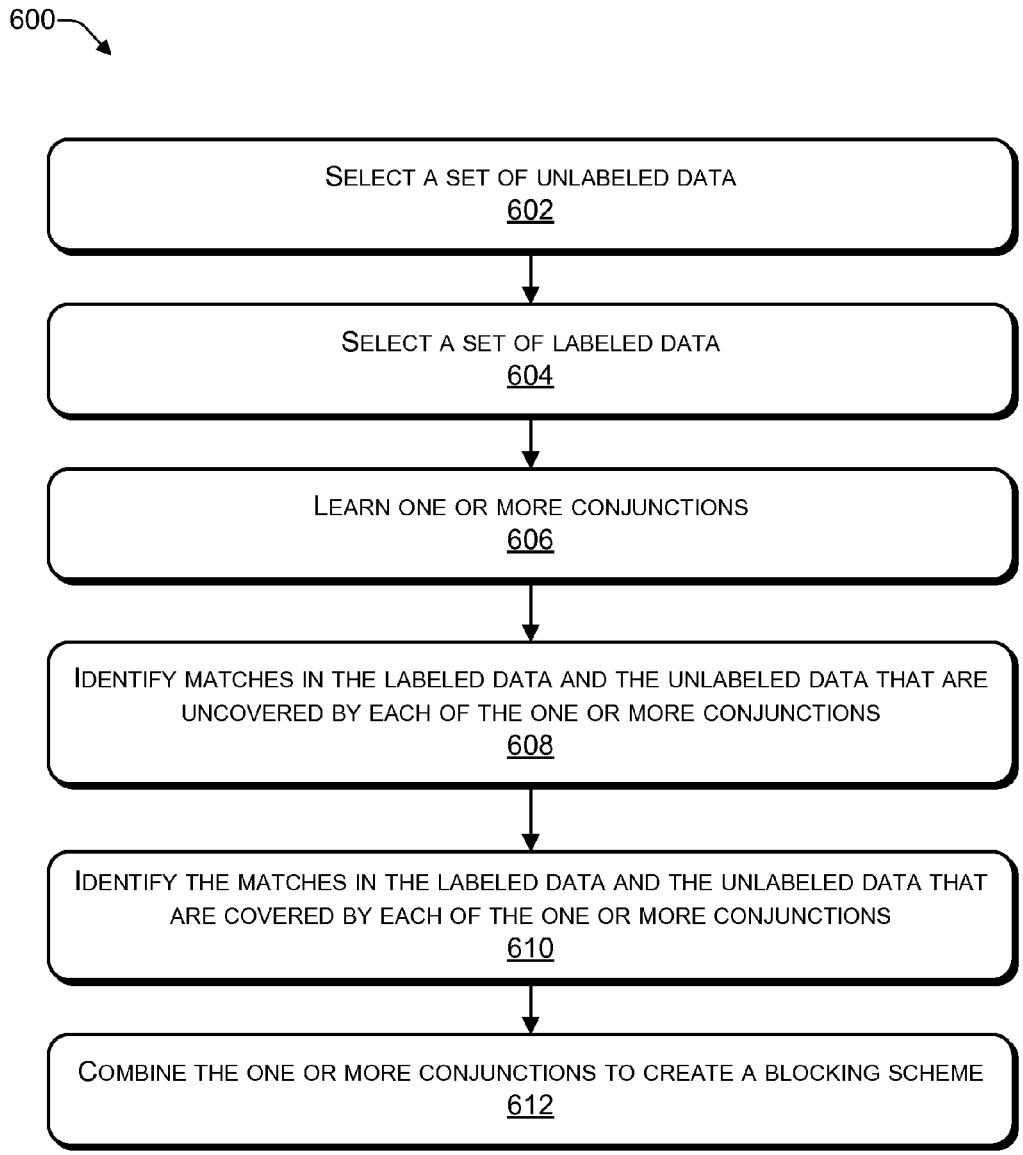
FIG. 6 is a flow diagram of an example process that includes providing matching records as search results to an originator of a query according to some implementations.
Figure 7:
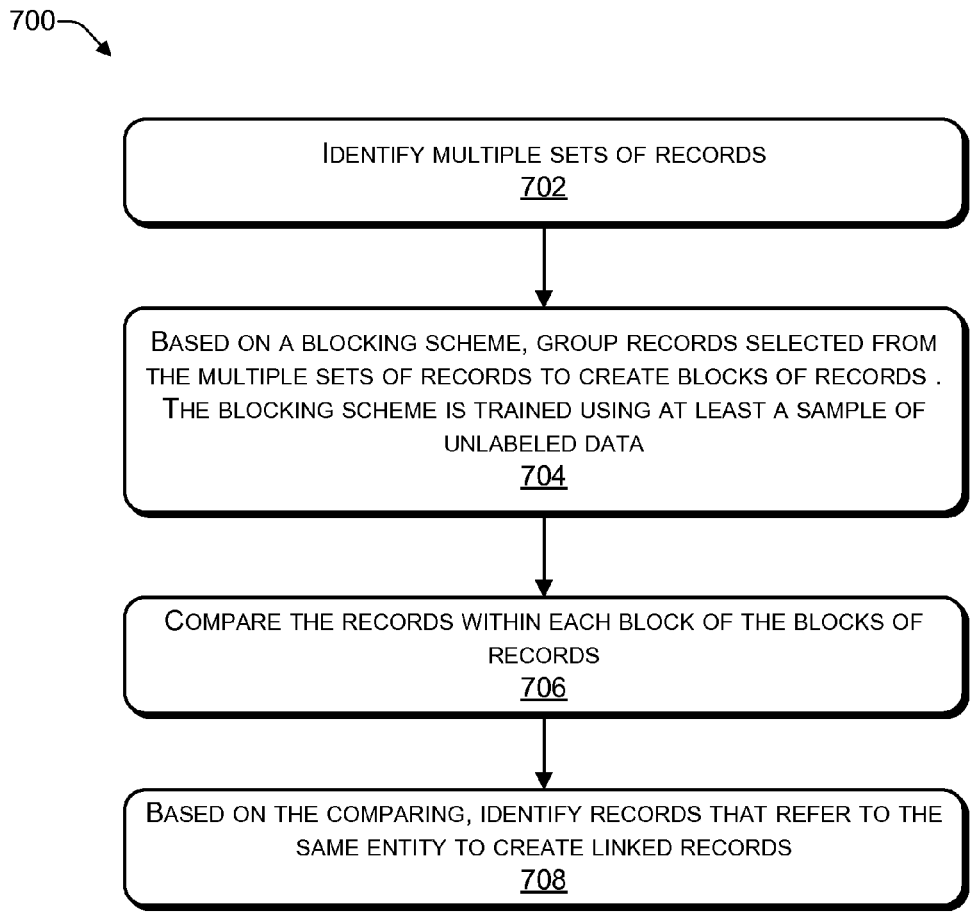
FIG. 7 is a flow diagram of an example process that providing matching records in response to a query according to some implementations.
Figure 8:
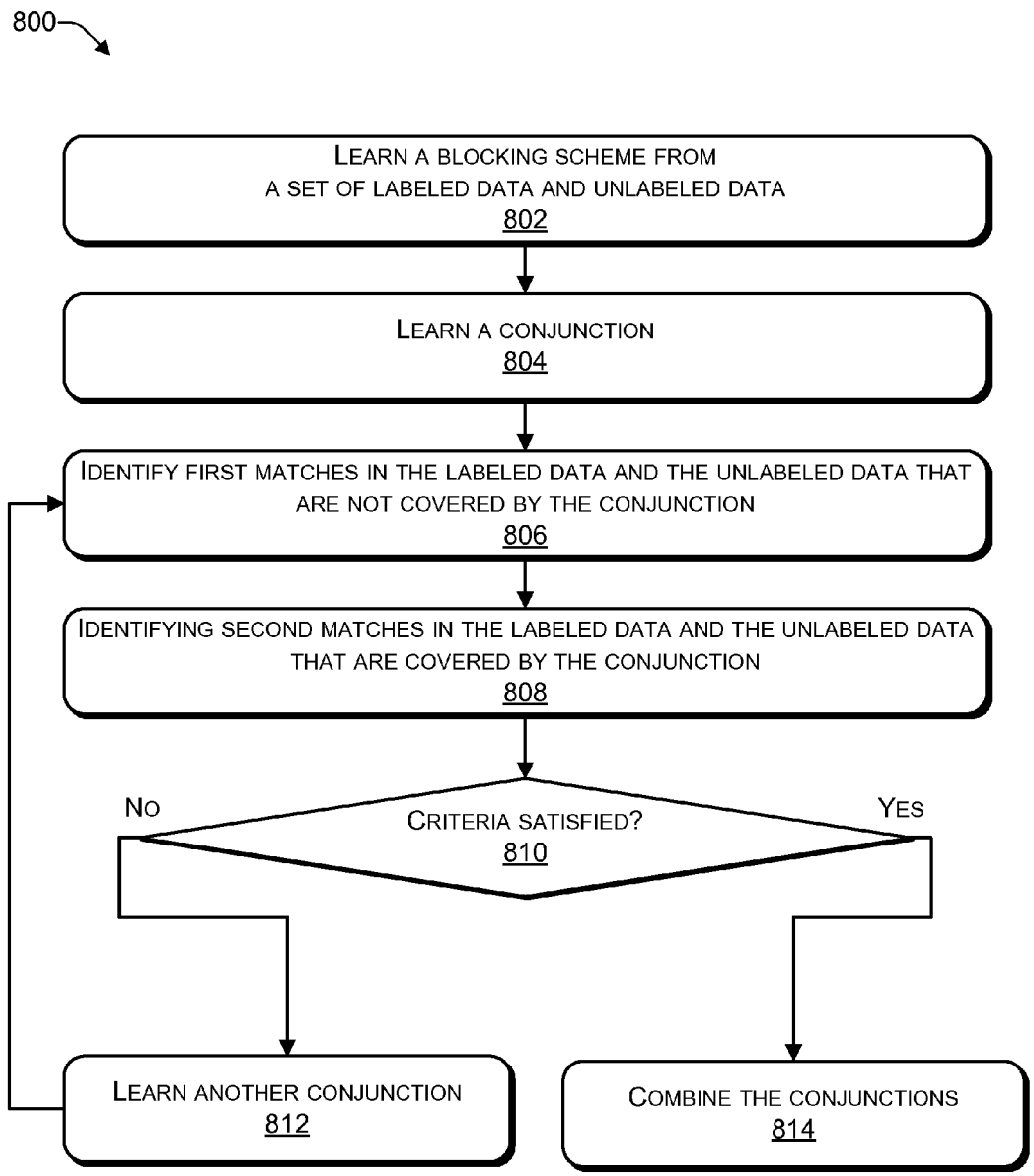
FIG. 8 is a flow diagram of an example process to train a blocking scheme according to some implementations.

FIGS. 6, 7, and 8 show various processes to implement a blocking scheme. In the processes, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes may described with reference to the frameworks 100, 200, or 300, described above, although other models, frameworks, systems and environments may implement these processes.

FIG. 6 is a flow diagram of an example process 600 to provide matching records as search results to an originator of a query according to some implementations. At block 602, a set of unlabeled data is selected. At block 604, a set of labeled data is selected. For example, in FIG. 2, the unlabeled data 204 may be sampled and the labeled data 208 may be selected.

At 606, one of more conjunctions may be learned. For example, the algorithm of FIG. 5 may be used to learn a conjunction.

At 608, matches in the labeled data and the unlabeled data that are uncovered (e.g., not covered) by the one or more conjunctions may be identified. At 610, the matches in the labeled data and the unlabeled data that are covered by each of the one or more conjunctions may be identified. For example, the algorithm of FIG. 4 may determine which matches the one or more conjunctions cover and which matches the one or more conjunctions do not cover.

At 612, the one or more conjunctions may be combined to create a blocking scheme. For example, the algorithm of FIG. 4 may repeatedly identify conjunctions that may be used to create a blocking scheme.

Thus, a blocking scheme may be trained using both labeled data and unlabeled data. The blocking scheme may be used to preprocess records by linking records from different data sets that refer to the same entity. A search engine may use the preprocessed records to reduce a time to search for records that match the entity and to improve an accuracy of the search by minimizing a number of records that are returned in the search results but do not match the entity.

FIG. 7 is a flow diagram of an example process 700 to provide matching records in response to a query according to some implementations.

At block 702, multiple sets of records may be identified. For example, in FIG. 1, the search engine 104 may crawl to identify one or more of the sets of records 114, 116, or 118.

At block 704, based on a blocking scheme, records selected from the multiple sets of records may be grouped to create blocks of records. The blocking scheme may be trained using training data that includes at least a sample of unlabeled data. For example, in FIG. 2, the blocking scheme 140 may be trained using a sample of the unlabeled data 204. In FIG. 1, the blocking scheme 140 may be used to group records selected from one or more of the sets of records 114, 116, or 118 into blocks.

At block 706, the records within each block of the blocks of records may be compared. For example, in FIG. 1, the link records 136 may be used to identify matching records to the entity (e.g., based on the blocks of records).

At block 708, records that refer to the same entity may be identified to create linked records based on the comparing. For example, in FIG. 3 a blocking scheme trained using labeled data and unlabeled data may identify records 306 and 312 as referring to the same entity and records 302 and 308 as referring to the same entity.

Thus, records may be grouped into blocks using a blocking scheme that is trained using both labeled data and unlabeled data. The records in each particular block may be compared with other records in the particular block to link (e.g., match) records that refer to the same entity. The blocking scheme may be used to preprocess records to identify records that refer to the same entity. A search engine may search the preprocessed records to reduce a time to search for records that match an entity of the search query and to improve an accuracy of the search by minimizing a number of records that are returned in the search results that do not match the entity.

FIG. 8 is a flow diagram of an example process to train a blocking scheme according to some implementations. In some implementations, such as when used with a search engine, the training may occur offline.

At block 802, a blocking scheme may be learned from a set of labeled data and unlabeled data. For example, in FIG. 1, the blocking scheme 140 may be learned (e.g., trained) using one or more of the labeled data 208 or the unlabeled data 204.

At block 804, a conjunction may be learned. For example, the conjunction may be learned using the learn-one-conjunction algorithm described in FIG. 5.

At block 806, first matches that are not covered by the conjunction may be identified in the labeled data and the unlabeled data.

At 808, second matches that are covered by the conjunction may be identified in the labeled data and the unlabeled data.

At 810, a determination is made whether criteria are satisfied. For example, a determination may be made whether the criteria expressed by the equation (2) is satisfied.

If the criteria is not satisfied, then the process proceeds to block 812, where another conjunction is learned (e.g., using the learn-one-conjunction algorithm of FIG. 5). If the criteria is satisified, then the process proceeds to block 814, where the conjunctions are combined.

Example Computing Device and Environment

Figure 9:
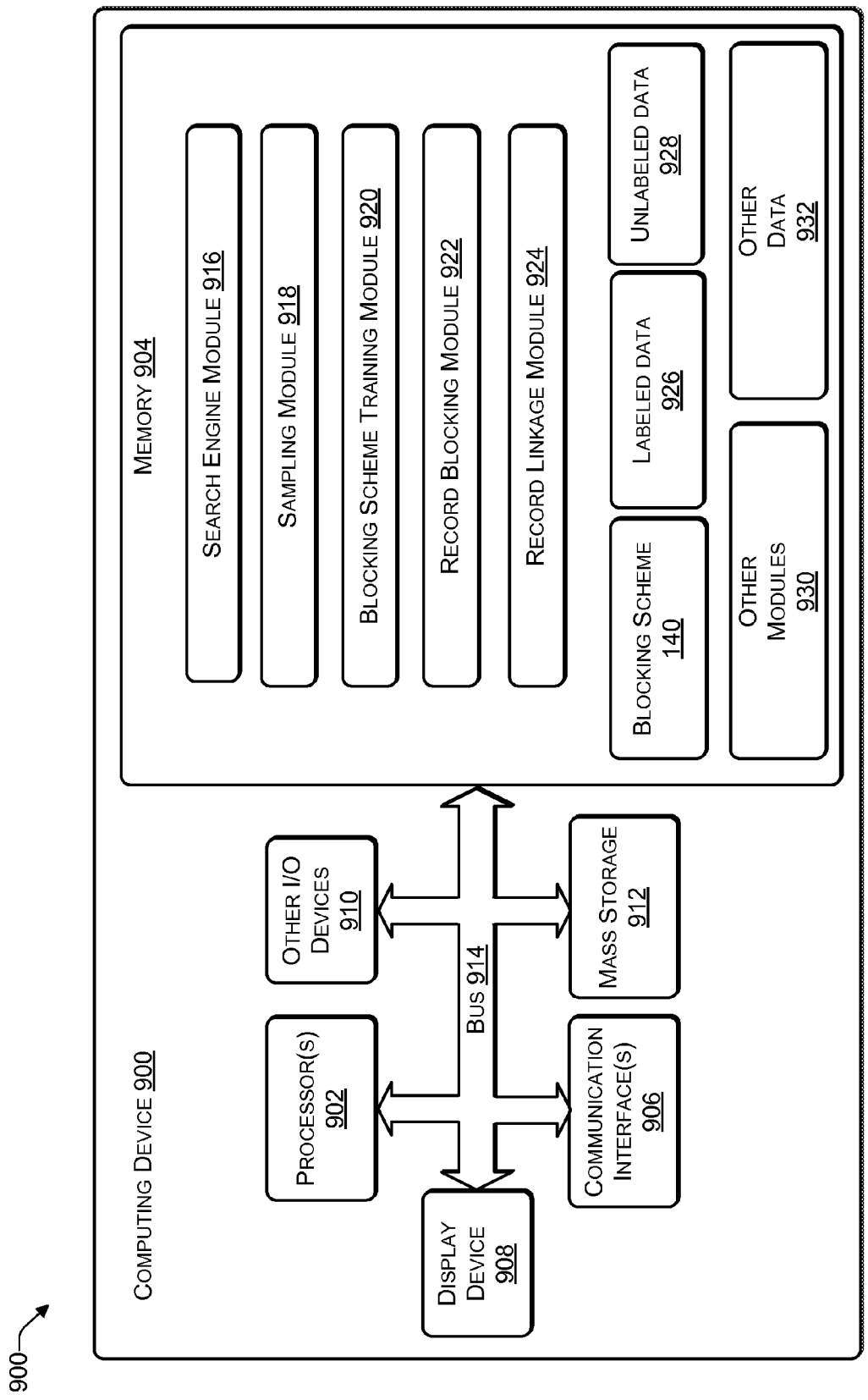
FIG. 9 is a block diagram of an example computing device and environment according to some implementations.

FIG. 9 illustrates an example configuration of a computing device 900 and environment that can be used to implement the modules and functions described herein. For example, each of the data sets 108, 110, 112 may be hosted by a computing device similar in architecture to the computing device 900. As another example, the search engine 104 or the computing device 102 may include an architecture that is similar to the computing device 900.

The computing device 900 may include at least one processor 902, a memory 904, communication interfaces 906, a display device 908, other input/output (I/O) devices 910, and one or more mass storage devices 912, able to communicate with each other, such as via a system bus 914 or other suitable connection.

The processor 902 may be a single processing unit or a number of processing units, all of which may include single or multiple computing units or multiple cores. The processor 902 can be implemented as one or more microprocessors, microcomputers, microcontrollers, digital signal processors, central processing units, state machines, logic circuitries, and/or any devices that manipulate signals based on operational instructions. Among other capabilities, the processor 902 can be configured to fetch and execute computer-readable instructions stored in the memory 904, mass storage devices 912, or other computer-readable media.

Memory 904 and mass storage devices 912 are examples of computer storage media for storing instructions which are executed by the processor 902 to perform the various functions described above. For example, memory 904 may generally include both volatile memory and non-volatile memory (e.g., RAM, ROM, or the like). Further, mass storage devices 912 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein, and may be a non-transitory media capable of storing computer-readable, processor-executable program instructions as computer program code that can be executed by the processor 902 as a particular machine configured for carrying out the operations and functions described in the implementations herein.

Although illustrated in FIG. 9 as being stored in memory 904 of computing device 900, the modules 916, 918, 920, 922, 924, and 930, or portions thereof, may be implemented using any form of computer-readable media that is accessible by computing device 900. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing device 900 may also include one or more communication interfaces 906 for exchanging data with other devices, such as via a network, direct connection, or the like, as discussed above. The communication interfaces 906 can facilitate communications within a wide variety of networks and protocol types, including wired networks (e.g., LAN, cable, etc.) and wireless networks (e.g., WLAN, cellular, satellite, etc.), the Internet and the like. Communication interfaces 906 can also provide communication with external storage (not shown), such as in a storage array, network attached storage, storage area network, or the like.

A display device 908, such as a monitor may be included in some implementations for displaying information and images to users. Other I/O devices 910 may be devices that receive various inputs from a user and provide various outputs to the user, and may include a keyboard, a remote controller, a mouse, a printer, audio input/output devices, and so forth.

Memory 904 may include modules and components for linking records based on a blocking scheme according to the implementations described herein. The memory 904 may include multiple modules to perform various functions, such as a search engine module 916, sampling module 918, a blocking scheme training module 920, a record blocking module 922, a record linkage module 924, and a candidate matching module 926. The search engine module 916 may be used to perform a search of multiple sets of records, such as the sets of records 114, 116, or 118. For example, the search engine module 916 may search multiple merchant websites that host multiple data sets (e.g., the data sets 108, 110, or 112) to provide records matching a particular entity (e.g., a make and model of a consumer product). The records may include pricing information. As another example, the search engine module 916 may search multiple social networking websites that host multiple data sets (e.g., the data sets 108, 110, or 112) to provide a profile that includes records matching a particular entity (e.g., a name of an individual). The sample module 918 may obtain samples from labeled data and/or from unlabeled data. The blocking scheme training module 920 may train a blocking scheme (e.g., the blocking scheme 140) using various algorithms, such as the algorithms described in FIG. 4 and FIG. 5. The record blocking module 922 may group records into blocks based on one or more blocking predicates. The record linkage module 924 may compare records that are grouped in the same block and link records that refer to the same entity. The memory 904 may be used to store the blocking scheme 140, and labeled data 926 (e.g., data sampled from one or more of the data sets 108, 110, or 112 and labeled by one or more people), and unlabeled data 928 (e.g., data sampled from one or more of the data sets 108, 110, or 112). The memory 904 may also include other modules 930 that implement other features and other data 932 that includes intermediate calculations and the like. Memory 904 may further include one or more other modules 916, such as an operating system, drivers, communication software, or the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method under control of one or more processors configured with executable instructions, the method comprising:
    selecting a set of unlabeled data;
    selecting a set of labeled data;
    learning one or more conjunctions;
    identifying matches in the labeled data and the unlabeled data that are uncovered by each of the one or more conjunctions;
    identifying the matches in the labeled data and the unlabeled data that are covered by each of the one or more conjunctions; and
    combining the one or more conjunctions to create a blocking scheme.

2. The method of claim 1, wherein the blocking scheme comprises a disjunction of a conjunction of blocking predicates.

3. The method of claim 1, wherein the blocking scheme is trained using at least the unlabeled data and the labeled data.

4. The method of claim 3, wherein the blocking scheme is trained to maximize a number of true matches in a candidate set generated from the labeled data.

5. The method of claim 3, wherein the blocking scheme is trained to minimize a number of candidate matches from the unlabeled data and the labeled data.

6. The method of claim 1, further comprising modifying a precision threshold parameter associated with the blocking scheme to increase a precision of the blocking scheme or to increase a recall of the blocking scheme.

7. The method of claim 1, wherein the blocking scheme is trained using a distribution of blocking attributes over the unlabeled data.

8. Computer-readable storage media including instructions executable by one or more processors to perform operations comprising:
    identifying multiple sets of records;
    grouping, based on a blocking scheme, records selected from the multiple sets of records to create blocks of records, the blocking scheme trained using training data that comprises at least a sample of unlabeled data;
    comparing the records within each block of the blocks of records; and
    identifying matching records that refer to a same entity based on the comparing to create linked records.

9. The computer-readable storage media of claim 8, wherein the blocking scheme is trained using training data that further comprises labeled data, the labeled data manually labeled.

10. The computer-readable storage media of claim 9, wherein the blocking scheme training comprises:
    identifying uncovered matches in the labeled data;
    learning one or more conjunctions;
    identifying matches in the labeled data and the unlabeled data that are uncovered by individual ones of the one or more conjunctions;
    identifying the matches in the labeled data and the unlabeled data that are covered by the individual ones of the one or more conjunctions; and
    combining the one or more conjunctions.

11. The computer-readable storage media of claim 8, wherein the blocking scheme is trained to increase a number of true matches identified in a candidate set generated from labeled data.

12. The computer-readable storage media of claim 8, wherein the blocking scheme is trained to decrease a number of candidate matches identified based on the unlabeled data and labeled data.

13. The computer-readable storage media of claim 8, wherein the blocking scheme is trained using a distribution of blocking attributes over the unlabeled data.

14. A computing device comprising:
    one or more processors;
    computer-readable media including instructions executable by the one or more processors to perform acts comprising:
        learning a blocking scheme from a set of labeled data and unlabeled data, the labeled data manually labeled and the unlabeled data not manually labeled, the learning comprising repeatedly performing following acts until particular criteria are satisfied:
        learning a conjunction;

identifying first matches in the labeled data and the unlabeled data that are uncovered by the conjunction;
identifying second matches in the labeled data and the unlabeled data that are covered by the conjunction; and
combining the conjunction learned in each iteration.

15. The computing device of claim 14, the instructions further executable by the one or more processors to perform acts comprising:
grouping, based on the blocking scheme, records selected from multiple sets of records to create blocks of records.

16. The computing device of claim 15, the instructions further executable by the one or more processors to perform acts comprising:
comparing the records within each block of the blocks of records; and
identifying matching records that refer to a same entity based on the comparing to create linked records.

17. The computing device of claim 14, wherein:
a first conjunction is learned in a first iteration and a second conjunction is learned in a second iteration that occurs after the first iteration; and
the first conjunction includes one or more predicates.

18. The computing device of claim 17, wherein the second conjunction includes at least one more predicate than the first conjunction.

19. The computing device of claim 17, wherein combining the conjunction learned in each iteration comprises creating a disjunction of the conjunction learned in each iteration.

20. The computing device of claim 16, further comprising performing a search on multiple sets of records to identify records that match an entity based on the blocking scheme.

* * * * *